Nov. 2, 1937.  F. M. SCHERTZ ET AL  2,098,110
PROCESS FOR EXTRACTING CHLOROPLAST PIGMENTS
Filed Dec. 29, 1933
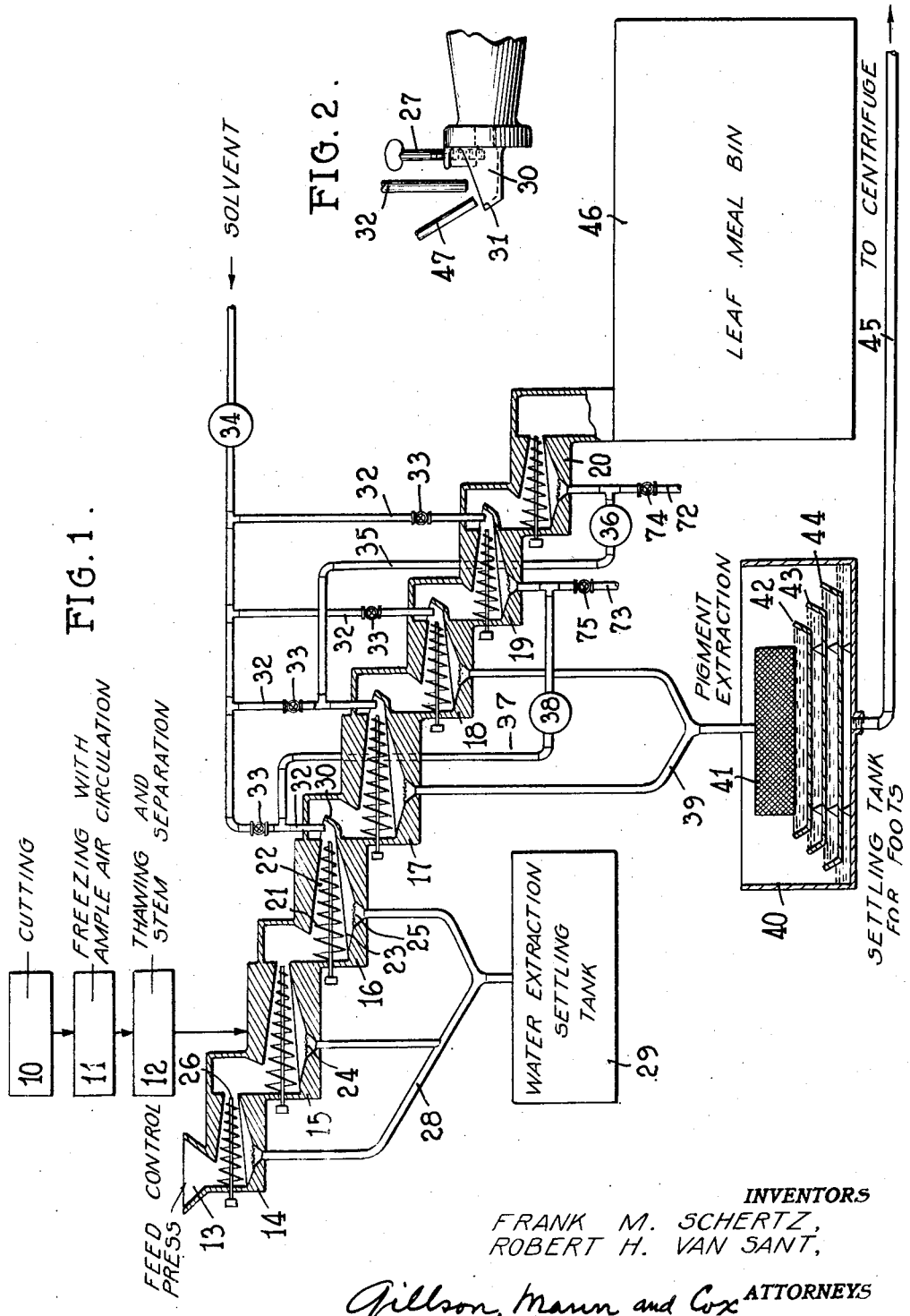
INVENTORS
FRANK M. SCHERTZ,
ROBERT H. VAN SANT,
Gillson, Mann and Cox ATTORNEYS Patented Nov. 2, 1937

2,098,110

UNITED STATES PATENT OFFICE 2,098,110

PROCESS FOR EXTRACTING CHLOROPLAST PIGMENTS

Frank M. Schertz and Robert H. Van Sant, Washington, D. C.

Application December 29, 1933, Serial No. 704,572

4 Claims. (Cl. 87—28)

The principal objects of this invention are to extract the chloroplast pigments—chlorophyll (a), chlorophyll (b), carotene (carotin or carrotine) and xanthophyll—in such quantity that they may be available to industry at commercial prices, and of such purity that they may be used for scientific investigations.

In our process, fresh gathered, green vegetation is first frozen, thawed, the leafy matter separated from the stems and the like, and placed in a suitable press by which the excess of substantially free moisture is forced out; then the mass is mixed with a solvent selected for the particular purpose in hand and again subjected to pressing; and this is repeated until the leafy material becomes practically colorless, which indicates that the pigments are all extracted.

The choice of vegetable matter, the location of the factory with respect to the source of supply and other features influence the preliminary steps.

According to the preferred procedure, the vegetable matter is gathered and frozen with the least possible exposure to sunlight or heat to prevent wilting and oxidation as much as possible. On principle, the vegetation should be cut or picked and immediately put into the freezing room and spread or hung where the circulating air or refrigerant can act upon it uniformly. However, this will be necessarily modified by conditions. Loading immediately into a freezing chamber, carried on a truck or the like, would be ideal, but in many instances will be too expensive.

Delay between cutting and freezing means oxidation more or less, and that spells injury to chlorophyll. Where pheophytin is the product sought, more latitude is allowable without injury.

As a general rule, it will be sufficient to load the vegetation as it is cut, transfer it without delay to some sort of freezing room where it can be spread out enough to be acted upon evenly and before any substantial wilting or oxidation has taken place. However it is handled, there should be no pile or layer thick enough to permit the inner portion to lag in freezing.

After freezing, the vegetation can be conveniently packed in barrels or casks and transferred to a holding freezer, or to cars for transportation to the place of treatment. Any handling after freezing tends to break the leaves from the stems and the stamping down in barrels, or the like, followed by emptying is usually sufficient to sever most of the leaves.

Thawing can be expedited by a blower which can also be made to effect the separation of the leafy material from the stems.

Just what takes place during the freezing and thawing are matters about which there is room for dispute. It is probable that freezing disrupts the cellular walls, but at any rate a substantial amount of the moisture in green vegetation can be removed by freezing, thawing and pressing, and like operations, and neither the freezing nor thawing cause any loss of the chloroplast pigments or any injury to them. The pressing causes no injury and little, if any, loss.

About 80% of the moisture can be pressed out, most of it at one operation, but a second pressing will often pay. The pressing should follow hard on the thawing and the mass should be worked cold and rapidly. Pressing will warm it up some, but care should be taken to keep it between freezing and 60° F. Keeping the solvents cold will aid in maintaining the desired low temperature.

It has also been observed that the solvents for the pigments act more readily and completely on the leafy material after the excess moisture has been removed by freezing, thawing and pressing. It may be assumed that the absence of moisture permits the solvents to act with full concentration and also that the cell structure or other protection ordinarily afforded by the vegetable matter is broken down or rendered less resistant to the solvents. However that may be, it is a fact that a quantitative extraction of all the pigments is greatly increased and expedited by this procedure.

The dried, compacted leafy material, weakened by the initial pressing or squeezing operation, must be loosened up with the appropriate solvent and the whole subjected to additional pressing or squeezing operations. And this should be repeated until the extraction is complete, which will depend much on the nature of the particular vegetation used.

The apparatus to be used for freezing, thawing, separating the leaves from the stems, or vines, squeezing or pressing, can be varied quite widely. It is largely a matter of selection according to conditions.

Subjecting the freshly cut material to acetone after freezing with dry ice in 80% methanol, at —10° to —20° C. has been found successful, but it is preferable to get rid of the excess moisture before using the solvent.

The product of each pressing operation after the solvent is applied will be a liquid containing more or less of the pigment and some entrained solid matter which latter can be removed by various ways, but settling tanks and centrifuging are the quickest and for that reason more satisfactory.

Further treatment to recover, refine and separate the pigments is largely a matter of choice and need not be described.

Generally speaking, this procedure is commercial with any vegetation bearing sufficient quantities of the pigments. Among those best known are alfalfa, spinach, stinging nettle, mulberry, cow peas and ragweed. Dicotyledonous plants lend themselves to extraction better than monocotyledonous do.

The actual temperature necessary to freeze will vary with the particular vegetation and condition of the moisture, and to some extent the latitude and other atmospheric conditions in which it grew.

Cow peas freeze very readily at zero Fahrenheit, spinach at five degrees and ragweed about the same temperature. A little cut and try will always be necessary until the conditions are fully known.

Soft plants like spinach tend to form a soup when treated alone and should be mixed with more fibrous material like cow peas for the pressing operations.

The drawing illustrates apparatus for carrying on the process.

Fig. 1 is a longitudinal section somewhat diagrammatically showing a series of presses and appurtenant devices which have been found suitable, parts being omitted for the sake of clearness.

Fig. 2 is an enlarged side elevation of one end of a press showing how it is fitted with a mixing cup or chamber for the vegetation and the solvents.

The cutting, freezing and thawing operations described are indicated by the rectangles 10, 11 and 12 (Fig. 1).

The product of these operations is fed to the hopper 13 of a press 14, forming the first or control press of a series, indicated at 15, 16, 17, 18, 19 and 20, each of which takes the form of the familiar fruit press, including a tapered screw 21 mounted to rotate in a ribbed tapering press chamber 22, the lower side of which has a pan or basin 24 fitted with a screen or strainer 23 guarding the discharge opening 25 for liquids. The rotation of the screw feeds the material gradually toward the right in the drawing, agitates the mass in doing so, and delivers it through the small end 26 of the press chamber.

As shown best in Fig. 2, each press is equipped with a screw 27 which may be adjusted across this discharge 26 to vary the rate of delivery, and, consequently the pressure in the chamber.

Liquids discharged by the presses 14, 15 and 16 are conducted by piping 28 to a settling tank 29.

Each of the presses 16, 17, 18 and 19 is equipped with a cup or pan 30 extending from the small end of the press chamber into which the vegetable matter is delivered more or less gradually according to the adjustments of the presses.

The wall 31 of the cup, remote from the press chamber, is inclined, and the vegetable matter will rise up over that wall and fall into the next press, as will be clear from Fig. 1. As it so rises, solvent is delivered through a pipe 32 under the control of a valve 33 and the gear pump 34. Generally speaking, the ground product of each press will absorb about an equal weight of solvent, and in so doing automatically loosens up, preparatory to entering the next press.

The solution of the pigments delivered by the presses 19 and 20 is weak as compared with that delivered by the presses 17 and 18. The weak solution can be used as a solvent in the earlier stages of the operation; and, to make that possible, press 20 is connected with the pipe 32 of the press 17 by piping 35 and a gear pump 36, and press 19 is connected with the pipe 32 of the press 16 by piping 37 and a gear pump 38. The outlets of presses 17 and 18 are connected by piping 39 with a settling tank 40. The solution is delivered first into a large screen 41 which removes most of the solid matter and allows the liquid entrained smaller particles to fall into a settling pan 42. Excess from this pan falls into a larger pan 43 and excess from that pan falls into a still larger pan 44, and so on as will suit the conditions. This arrangement provides a series of settlings, and delivers a fairly clean solution to the tank 40, and it is drawn off from that tank through a pipe 45 leading to the centrifuge or other separator.

The vegetable matter delivered by the last press 20 passes into a bin 46.

It has been found that presses 18, 19 and 20 may be of smaller size than presses 15, 16 and 17, and that the whole operation will be improved by using a smaller size for the control press 14.

The screws are driven in any suitable manner, as by electric motors and in unison. By using a smaller press for the control or first press, the series does not become overloaded, which is a costly operation for, when the presses are stopped while charged, they have to be taken apart and emptied before they can be started again. This becomes a particularly expensive operation where the whole series is connected, as indicated in Fig. 1, to form one continuous and closed housing or casing, which is the best way owing to the volatile character of the solvents.

Acetone is the best solvent for the pigments and is most easily separated from them by washing with water. Ethanol is a good solvent, but it is very difficult to wash out from the pigments, taking many times the amount of water required for a corresponding amount of acetone.

The solution of the pigments in the acetone when conducted into a suitable chamber with petroleum ether and water will result in a precipitation of the pigments. This is quite an advantage and cannot be had when ethanol and the like are used in the pressing operations.

The fruit presses on the market of suitable size are poorly made of ordinary cast iron and cannot well stand the stresses required for the first operation. They should be made of steel.

When the presses are stopped while charged, the mass tends to harden and will make starting difficult or impossible without taking the presses apart and digging out the hardened material. But if water is poured in promptly after stopping the hardening is retarded or prevented, pipes 47 (shown only in Fig. 2 to avoid confusion in Fig. 1) for delivering water into each cup 30 and hopper 13 will save much trouble.

In treating some materials, the freezing and thawing steps may well be omitted. For example, in extracting carotene from carrots, the fresh vegetables are merely cut into suitable pieces, fed into the control press and run through the remaining steps as described for green vegetation. The action of the presses is sufficient to remove the excess water from vegetables like carrots and fruits like apricots.

Other variations will be dictated by some experience with particular materials and conditions.

We claim as our invention:—

1. The method of extracting chloroplast pigments which includes freezing fresh vegetable matter containing chloroplast pigments to a temperature of not above —10 degrees centigrade, thawing the same, promptly removing excess moisture therefrom by mechanical means, and then promptly extracting the chloroplasts by applying and expressing a liquid chloroplast solvent.

2. The method of extracting chloroplast pigments which includes freezing fresh vegetable matter containing chloroplast pigments to a temperature of not above —10 degrees centigrade, thawing the same, promptly removing excess moisture therefrom by mechanical means, and then promptly extracting the chloroplasts by repeatedly applying and expressing a liquid chloroplast solvent.

3. The method of extracting chloroplast pigments which includes freezing fresh vegetable matter containing chloroplast pigments to a temperature of not above —10 degrees centigrade, thawing the same, removing excess moisture therefrom by mechanical means while the matter remains cold, treating the matter with acetone to dissolve the chloroplast pigments, and then mechanically removing the acetone and matter dissolved therein from the mass.

4. The method of extracting chloroplast pigments which includes freezing fresh vegetable matter containing chloroplast pigments to a temperature of not above —10 degrees centigrade, thawing the same, removing excess moisture therefrom by mechanical means while the matter remains cold, treating the matter with acetone to dissolve the chloroplast pigments, and then mechanically removing the acetone and matter dissolved therein from the mass while maintaining the mass at a temperature not above 60 degrees Fahrenheit.

FRANK M. SCHERTZ.
ROBERT H. VAN SANT.